United States Patent
Cox

(10) Patent No.: US 9,963,224 B2
(45) Date of Patent: May 8, 2018

(54) METHOD FOR MAXIMIZING POWERED AIRCRAFT DRIVE WHEEL TRACTION

(71) Applicant: Borealis Technical Limited, North Plains, OR (US)

(72) Inventor: Isaiah W. Cox, London (GB)

(73) Assignee: Borealis Technical Limited, Gibraltar (GI)

( * ) Notice: Subject to any disclaimer, the term of this patent is extended or adjusted under 35 U.S.C. 154(b) by 0 days. days.

(21) Appl. No.: 15/629,668

(22) Filed: Jun. 21, 2017

(65) Prior Publication Data
US 2017/0349269 A1 Dec. 7, 2017

Related U.S. Application Data

(62) Division of application No. 14/341,746, filed on Jul. 25, 2014, now Pat. No. 9,725,161.

(51) Int. Cl.
*B64C 25/40* (2006.01)

(52) U.S. Cl.
CPC ........... *B64C 25/405* (2013.01); *Y02T 50/823* (2013.01)

(58) Field of Classification Search
CPC ............................ B64C 25/405; Y02T 50/823
See application file for complete search history.

(56) References Cited

U.S. PATENT DOCUMENTS

| | | | | |
|---|---|---|---|---|
| 3,936,016 A | * | 2/1976 | Shiber | B60T 8/1703 244/103 S |
| 5,135,290 A | * | 8/1992 | Cao | B60T 8/175 180/197 |
| 6,125,318 A | * | 9/2000 | Zierolf | B64C 25/44 303/148 |
| 6,577,944 B1 | * | 6/2003 | Davis | B60K 28/16 180/197 |
| 7,445,178 B2 | * | 11/2008 | McCoskey | B64F 1/32 244/100 R |
| 7,891,609 B2 | * | 2/2011 | Cox | B64C 25/405 244/100 R |
| 9,280,155 B2 | * | 3/2016 | Cox | G05D 1/0083 |
| 2009/0218440 A1 | * | 9/2009 | Dilmaghani | B64C 25/405 244/50 |
| 2009/0261197 A1 | * | 10/2009 | Cox | B64C 25/36 244/50 |
| 2010/0147995 A1 | * | 6/2010 | Cros | B64C 25/405 244/50 |
| 2011/0089289 A1 | * | 4/2011 | Wilson | B64C 25/405 244/50 |
| 2012/0168557 A1 | * | 7/2012 | Edelson | B64C 25/405 244/50 |

(Continued)

Primary Examiner — Christopher P Ellis

(57) ABSTRACT

A method for maximizing traction in an aircraft drive wheel powered by non-engine drive means controllable to move the aircraft on the ground without reliance on the aircraft's brakes and dependence on friction defined by a mu-slip curve. The non-engine drive means is operated to control wheel speed and maintain the powered drive wheel in a maximized optimal traction condition when driving torques are applied to the drive wheel. Traction can be automatically maximized and maintained within an optimal range defined by a relationship between slippage and braking for maximum efficiency of aircraft ground travel under a wide variety of surface, weather, temperature, tire, and other conditions.

4 Claims, 2 Drawing Sheets

(56) References Cited

U.S. PATENT DOCUMENTS

| | | | |
|---|---|---|---|
| 2012/0217339 A1* | 8/2012 | Gilleran | B64C 25/405 244/50 |
| 2012/0277943 A1* | 11/2012 | Kim | B60W 10/06 701/22 |
| 2014/0027571 A1* | 1/2014 | Barmichev | B60C 11/1612 244/103 R |
| 2015/0005988 A1* | 1/2015 | Cox | B60L 3/108 701/3 |

* cited by examiner

METHOD FOR MAXIMIZING POWERED AIRCRAFT DRIVE WHEEL TRACTION

PRIORITY CLAIM

This application is a divisional of pending U.S. patent application Ser. No. 14/341,746, filed 25 Jul. 2014, the disclosure of which is incorporated herein in its entirety by reference, and which claims priority from International Patent Application No. PCT/US2013/74173, filed 10 Dec. 2013.

TECHNICAL FIELD

The present invention relates generally to traction in powered vehicle drive wheels and specifically to a method for maximizing traction in an aircraft landing gear drive wheel powered by a controllable non-engine drive means to move the aircraft autonomously on the ground.

BACKGROUND OF THE INVENTION

Traction of a vehicle is established as its wheels contact a surface so that when the wheels are rotated, usually by a driving force, the vehicle will be moved along the surface in a desired direction. The combination of the coefficient of friction, mu ($\mu$), and the force exerted by a wheel against the surface produces traction. When the coefficient of friction of the surface is less than the force exerted, the wheel will slip during acceleration of the vehicle, adversely affecting acceleration performance and driving stability. Slippage can occur as a result of excessive accelerative forces applied to vehicle wheels or inadequate wheel to surface friction that can be present with wet or icy conditions, as well as in other surface conditions. Once the condition is recognized, a vehicle driver, particularly in an automobile or like vehicle, may try to control slippage by reducing engine power or by applying the brakes, both of which can reduce the speed at which a drive wheel is rotating. The driver may not be aware that slippage is occurring, however, and may not be able to take corrective action as quickly as required. Traction should be controlled in a manner that does not need driver action so that, at a minimum, slipping may be limited or, optimally, a vehicle's wheels may be prevented from slipping during acceleration on different surfaces.

Aircraft are required to travel between landing and takeoff on ground surfaces that may vary in quality, and traction control during taxi can be a challenge, particularly under adverse weather or runway conditions. Aircraft ground travel is presently conducted by using thrust from the aircraft's main engines and/or by tow vehicles to move aircraft between runways and gates or parking locations after landing and prior to takeoff. Apart from the application of the aircraft's brakes, simple effective traction control has not heretofore been possible during this type of aircraft ground movement.

Antiskid and traction control systems have been proposed for vehicles that travel on ground surfaces, including aircraft. Such systems have typically been used in connection with a vehicle's brakes. Most available systems include an antiskid controller that compares the vehicle speed derived from a wheel speed sensor to the vehicle speed derived from another source. If the wheel is determined to be skidding or slipping an excessive amount, the vehicle brakes are released, and the wheel is permitted to spin at an appropriate speed to move the vehicle on the surface. The determination of what amount of slipping is excessive and what amount of slipping is appropriate presents challenges for antiskid system brake controllers. Some vehicle antiskid control systems provide a model of a mu-slip curve that describes tire-to-road surface friction characteristics. Slip velocity, the difference between wheel velocity and vehicle velocity, is compared with a predetermined set point on the mu-slip curve to enable the controller to produce an appropriate amount of slip during vehicle travel. For aircraft, an antiskid controller should prevent excessive slipping or skidding when the aircraft lands and while the aircraft is taxiing between landing and takeoff.

A tire mu-slip curve is usually used to describe the developed friction of a braked tire and compares slip ratio with tire friction. A slip ratio of zero represents a free rolling tire and a slip ratio of 1.0 represents a locked wheel. The slip ratio and developed friction increase as braking is increased and maximum friction is reached. Ideally, an antiskid system operates at the maximum friction point. Operation beyond the maximum friction point produces skids or slips, while a decrease in friction without a corresponding decrease in braking will produce a locked wheel. When a tire is slipping slightly, it has more traction than when it is not slipping. Unlike the driver of an automobile or similar vehicle, an aircraft pilot is not likely to hear or feel a locking wheel. Without a functioning antiskid control system, a locked aircraft wheel can blow a tire in as little as 3 milliseconds at high speeds.

The peak of the mu-slip curve representing maximum friction and the location of the peak, although factors affecting the location are not fully understood, have been important considerations in the design of available vehicle antiskid control systems. Maximum friction generally occurs at about 10 to 20% slip. Operation of vehicle brakes at the peak of the mu-slip curve tends to produce the highest efficiency in current antiskid systems.

As noted, aircraft ground movement presently requires operation of the aircraft's main engines and assistance from tow vehicles. Controlling the speed of aircraft ground movement requires a combination of applying the aircraft's brakes to slow aircraft and increasing engine thrust to speed up the aircraft. Aircraft antiskid or traction control systems, as described above, may be used to modulate braking action to keep the aircraft moving under a range of ground surface and other conditions without skidding or locking wheels. Such systems are described in, for example, U.S. Pat. No. 5,135,290 to Cao; U.S. Pat. No. 5,918,951 to Rudd, III; and U.S. Pat. No. 6,125,318 to Zierolf. None of the aforementioned systems, however, suggests producing optimal traction in an aircraft with a landing gear drive wheel powered for ground movement by a non-engine drive means that is not dependent on friction values defined by a mu-slip curve.

Moving an aircraft on the ground without the operation of the aircraft's engines or the use of tow vehicles has been proposed. For example, U.S. Pat. No. 7,891,609 to Cox et al, owned in common with the present application, describes moving an aircraft along taxiways using at least one self propelled undercarriage wheel. McCoskey et al describes a powered nose aircraft wheel system useful in a method of taxiing an aircraft that can minimize the assistance needed from tugs and the aircraft engines in U.S. Pat. No. 7,445,178. Neither antiskid control or traction control nor a system that maximizes traction in an aircraft drive wheel during ground travel is suggested in either of these patents, however.

A need exists for a way to maximize traction in an aircraft drive wheel powered by non-engine drive means controllable to move the aircraft on the ground without reliance on the aircraft's main engines that produces optimal traction without dependence on the aircraft's brakes and friction values defined by a mu-slip curve.

SUMMARY OF THE INVENTION

It is a primary object of the present invention, therefore, to provide a method for maximizing traction in an aircraft drive wheel powered by non-engine drive means controllable to move the aircraft on the ground without reliance on the aircraft's main engines that produces optimal traction without dependence on the aircraft's brakes and friction values defined by a mu-slip curve.

It is another object of the present invention to provide a method for maximizing traction in a powered aircraft drive wheel that controls wheel speed to keep the wheel in an optimal traction condition when driving torques are applied to the wheel by a non-engine drive means during aircraft ground movement.

It is an additional object of the present invention to provide a method for maximizing traction in an aircraft drive wheel powered by non-engine drive means that may use information obtained from a mu-slip curve to prevent a drive wheel from excessive overspeed.

It is a further object of the present invention to provide a method for maintaining optimal traction in an aircraft drive wheel powered by non-engine drive means that employs a drive means operation feedback loop to control and maintain optimal traction during aircraft ground travel.

It is yet another object of the present invention to provide a method for automatically maintaining traction within an optimal range for aircraft ground travel under virtually any ground surface, weather, temperature, and/or tire conditions during aircraft ground travel.

In accordance with the aforesaid objects, a method for maximizing traction in an aircraft drive wheel powered by non-engine drive means controllable to move the aircraft on the ground without reliance on the aircraft's brakes and dependence on friction values defined by a mu-slip curve is provided. Operation of the drive means to control wheel speed and maintain the wheel in an optimal traction condition when driving torques are applied to the drive wheel may be accomplished with a drive means feedback loop. Traction may be automatically maintained within an optimal range for maximum efficiency of aircraft ground travel under a wide variety of surface, weather, temperature, tire, and other conditions with the present method.

Other objects of the present invention will become apparent from the following description, drawings, and claims.

DESCRIPTION OF THE INVENTION

Figure 1:
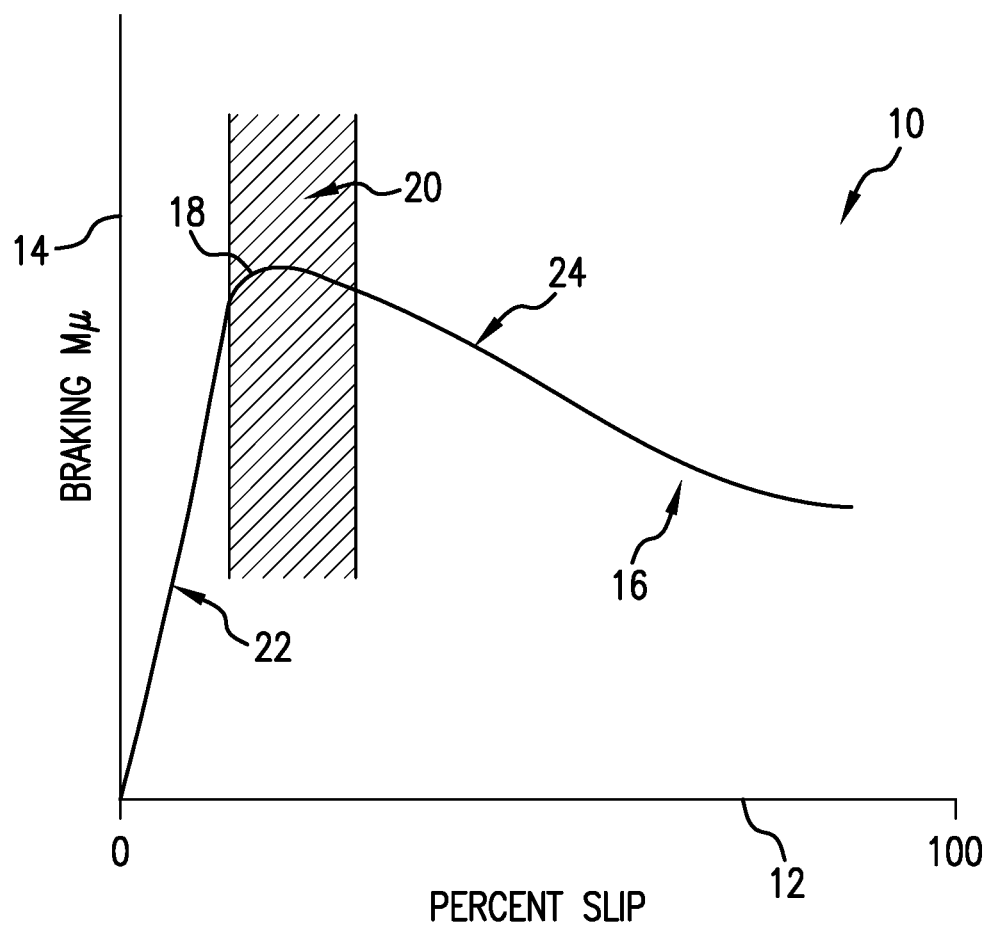
FIG. 1 shows a mu-slip curve that may be used to define a friction or slip profile relating to aircraft ground movement in an aircraft driven autonomously on the ground by one or more drive wheels powered by non-engine drive means.

Traction control in an aircraft equipped with one or more powered drive wheels as described in detail below requires the capability to reduce the rotational speed of the powered drive wheels to match the aircraft travel speed over a runway or taxiway surface. At the present time, aircraft wheel rotational speed is generally reduced by braking, although the reduction of the fuel supplied or the timing of the fuel supplied to the aircraft engine when engine thrust is used to produce aircraft ground movement can also reduce speed. Driving traction in an aircraft during ground travel is produced by the force of the aircraft's wheels against the ground surface and surface frictional forces represented by the surface coefficient of adhesion or friction, mu ($\mu$). The force exerted by an aircraft wheel, which is directed perpendicularly toward the ground surface, may be described as including a proportional force normal to the surface and a proportional force parallel to the surface. The proportional force normal to the surface is part of the traction frictional force. If a sufficiently large torque or drive force is applied from the wheel to the ground surface tangent to a contact point between the wheel and the ground surface, the frictional grip, or static friction, between the wheel and the ground surface will be overcome. This causes the wheel to slip in relation to the ground surface so that the wheel is rotating at a higher surface speed than its forward travel velocity, which creates a greater opportunity for slippage of the wheel. When a driving torque is applied to an aircraft tire through the wheel, a tractive force, proportional to $\mu$, develops at a contact area where the tire contacts the ground surface. The tire tread in front of and within in the contact area is subject to compression while the wheel is being driven. As a result, the distance the tire travels when subjected to a driving torque will be less than when the tire is free rolling. Unless restrained and/or corrected, the wheel will continue to rotate at an increasingly faster speed, and continued control of aircraft speed or travel direction may present challenges.

Unlike the automatic control of wheel slippage against a road surface in automobiles, which has received extensive attention, the control of wheel slippage in aircraft during ground travel has only recently been addressed. Aircraft traction control to date has relied on a system of mechanical sensors to measure and detect when a wheel is skidding or slipping, and braking force is hydraulically released on that wheel, which allows the aircraft to control skidding regardless of ground surface conditions. Unlike automobiles, which may have two to four drive wheels and can transfer power from one wheel to another through a differential to control traction, aircraft have not been equipped with drive wheels for ground movement. Consequently, aircraft have had to rely on the use of their hydraulic braking system for traction control.

Commonly owned U.S. patent application Ser. No. 13/691,828, filed 2 Dec. 2012, and entitled *Aircraft Ground Travel Traction Control System and Method*, the disclosure of which is fully incorporated herein, provides a traction control system and method for an aircraft equipped with a ground travel drive system. This system, which includes an onboard non-engine drive means capable of translating torque through aircraft drive wheels, automatically controls traction without reliance on the aircraft's brakes to keep the aircraft moving efficiently and autonomously on the ground under a range of environmental conditions. The present method further refines the aforementioned traction control method to maximize optimal traction during taxi in an aircraft drive wheel powered by non-engine drive means for autonomous ground movement.

The term "drive means" as used herein generally refers to any engine or non-engine onboard drive means, whether or not located in a wheel, capable of moving an aircraft on the ground. A non-engine drive means is preferred for powering an aircraft drive wheel in accordance with the present method, however. A non-engine drive means preferred for powering an aircraft drive wheel to maximize drive wheel traction with the method of the present invention could be any one of a number of electric drive means or motor designs. For example, a suitable electric drive means may be an inside-out motor attached to a wheel hub in which a rotor can be internal to or external to a stator, such as that shown and described in U.S. Patent Application Publication No. 2006/0273686, the disclosure of which is incorporated herein by reference. A toroidally-wound motor, an axial flux motor, a permanent magnet brushless motor, a synchronous motor, an asynchronous motor, a pancake motor, a switched reluctance motor, electric induction motor, or any other electric motor geometry or type known in the art is also contemplated to be suitable for use in the present invention.

Other motors suitable for this purpose that may be used as drive means in an aircraft environment include pneumatic motors driven by bleed air and hydraulic motors. Additionally, although not preferred, drive means or motors driven by thrust directly from the engines or by any other appropriate type of propulsion system are also contemplated for powering aircraft drive wheels in the traction maximizing method of the present invention.

The drive means selected should be able to drive an aircraft wheel at a desired speed and torque capable of moving an aircraft on the ground at runway speeds. One type of electric drive means preferred for this purpose is a high phase order electric motor of the kind described in, for example, U.S. Pat. Nos. 6,657,334; 6,838,791; 7,116,019; and 7,469,858, all of which are owned in common with the present invention. A geared motor, such as that shown and described in U.S. Pat. No. 7,469,858, is designed to produce the torque required to move a commercial sized aircraft at an optimum speed for ground movement. The disclosures of the aforementioned patents are fully incorporated herein by reference. Other motor designs, such as that described in commonly owned co-pending International Patent Application No. PCT/US/13/51407, filed 19 Jul. 2013, and entitled *Aircraft Drive Wheel System with Roller Traction Drive System*, the disclosure of which is fully incorporated herein, that are capable of high torque operation across a desired speed range and can move an aircraft wheel to function as described herein may also be suitable for use with the present method and are contemplated to be within the scope of the present invention. One preferred motor is a high phase order induction motor with a top tangential speed of about 15,000 linear feet per minute and a maximum rotor speed of about 7200 rpm. With an effective wheel diameter of about 27 inches and an appropriate gear ratio, an optimum top speed of about 28 miles per hour (mph) may be achieved, although any speed appropriate for aircraft ground travel in a particular runway environment could be achieved.

Moving an aircraft on the ground using an onboard non-engine drive means requires providing sufficient power to the drive means to produce a torque capable of driving an aircraft wheel to move the aircraft at a desired ground or taxi speed. As indicated, drive means preferred for the present method are electric motors. The current, and the voltage and frequency of the current, applied to the motor may be controlled to regulate speed. In an aircraft wheel drive assembly useful in the present invention, current to power the motor preferably originates with the aircraft auxiliary power unit (APU). Other power sources could also be used to supplement or replace the APU as a source of power. These power sources may include, for example without limitation, an aircraft engine auxiliary power unit, fuel cells, any kind of solar power units, POWER CHIPS™, batteries, and burn boxes, as well as any other suitable power source effective for this purpose. If the drive means selected for use in the present traction maximizing method is a pneumatic motor, power could be supplied by the main engines, the main engines' auxiliary power units, and/or thrust from the main engines. Control of the flow of current to the drive means, as well as the voltage and frequency of the current, allows the torque generated by the drive means to be controlled and, consequently, the speed of the wheel powered by the drive means and the ground travel speed of the aircraft to be controlled. This type of control may be achieved with any of the aforementioned power sources. Depending on the specific power source used, modification of the control of current flow to the selected non-engine drive means to generate the desired torque may be required.

Referring to the drawings, FIG. 1 shows a mu-slip curve that may be used to define optimal traction or antiskid control for an aircraft traveling on a ground surface. Any wheel, including an aircraft wheel, typically will slip whenever braking torque is applied to the wheel as it rotates. In this instance, slip is defined as occurring when the aircraft wheel rotational speed multiplied by the aircraft wheel radius is less than the translational speed of the aircraft wheel. The amount of slip determines the drag produced at an aircraft's tire/runway surface interface. An optimum amount of slip produces a maximum tire drag as defined by a mu-slip curve, such as that shown in FIG. 1. Mu-slip curves may be dependent upon a variety of factors, including type and condition of ground surface and tires, as well as temperature, weather conditions, and other factors affecting aircraft ground travel.

The graph 10 in FIG. 1 illustrates a mu-slip curve derived from a comparison of percent slip, represented by the x-axis 12, with applied braking torque, represented by the y-axis 14. The percent slip is determined by subtracting the percent synchronous speed of a non-engine drive means used to drive an aircraft wheel from 100. Curve 16 shows the relationship between values for percent slip and braking, which produces a well-defined peak at 18. As noted in the Background of the Invention section above, the peak, such as peak 18, of a mu-slip curve indicates when maximum friction exists, and it is the goal of an anti-skid system to operate at or near the peak of the mu-slip curve. In the FIG. 1 mu-slip curve, the shaded region 20 indicates an antiskid control region at or near the peak 18. Maximum efficiency may be obtained within region 20 for this mu-slip curve. A portion 22 of the curve, representing a low percent slip, indicates a stable condition in which a tire is slipping slightly and may actually have more traction than when the tire is not slipping. A portion 24 of the curve beyond the peak 18 and region 20 represents a high percent slip and an unstable condition. An aircraft or other vehicle wheel experiencing slip beyond an optimum amount is considered to be excessively skidding.

While aircraft nose landing gear wheels are the preferred powered aircraft drive wheels in which traction may be maximized, the method described herein could also be used when non-engine drive means are mounted to drive main landing gear wheels. Although equipping and powering at least one nose wheel with drive means may provide traction control, it is preferred that both nose wheels in a nose landing gear be equipped and powered with non-engine drive means to most effectively maximize traction control. In this case, traction in each wheel may be controlled and maximized individually.

Figure 2:
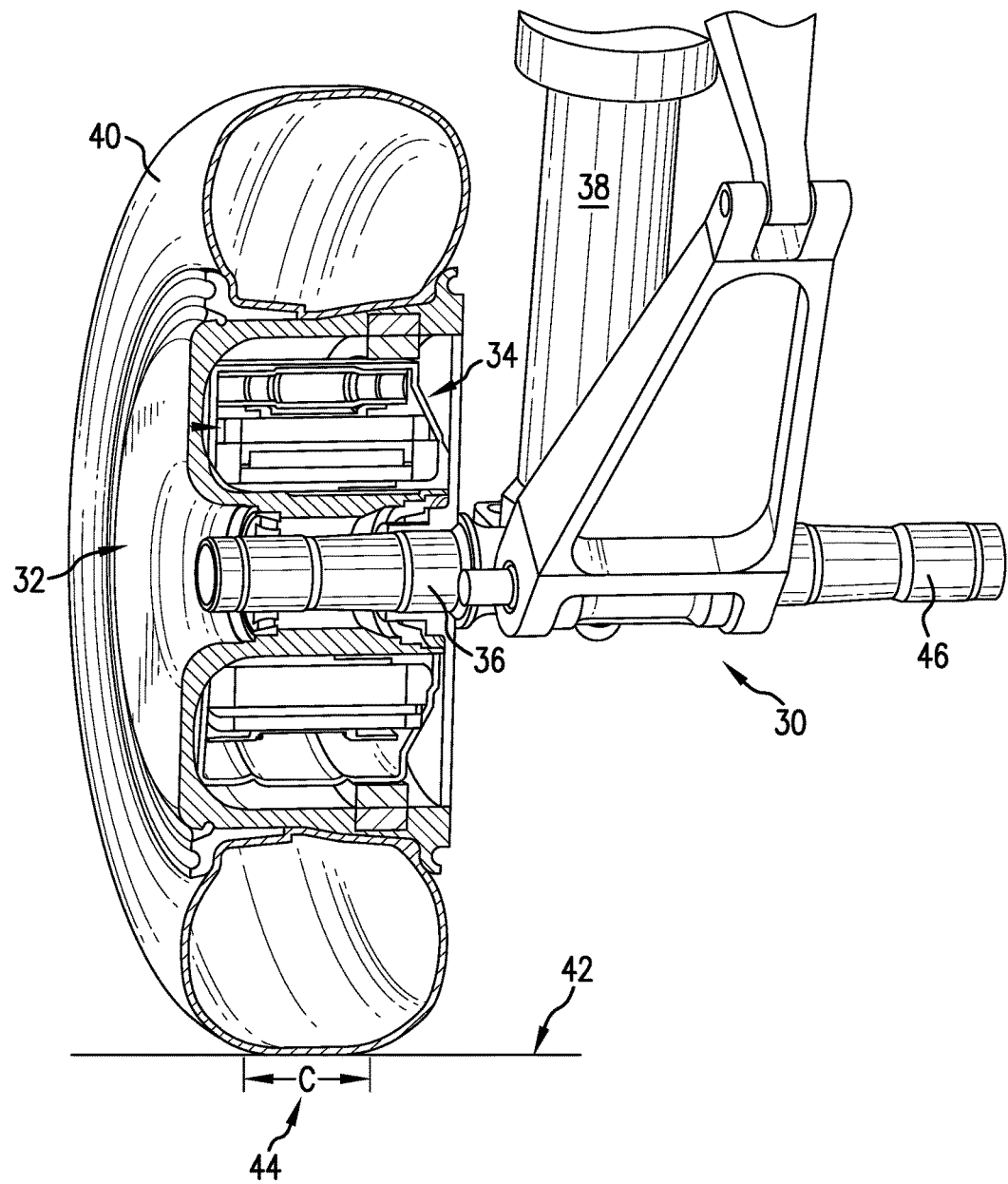
FIG. 2 is a schematic diagram of a partial cross-section of an aircraft landing gear with a drive wheel powered by non-engine drive means controllable to move an aircraft autonomously on the ground without reliance on the aircraft's main engines or tow vehicles.

FIG. 2 illustrates schematically in partial cross-section a portion of an aircraft nose landing gear 30 with a drive wheel 32 and one embodiment of a non-engine drive means 34 capable of powering the wheel to drive the aircraft on the ground during taxi and other ground travel while drive wheel traction is maximized as described herein. The drive wheel 32 may be rotatably mounted on an axle 36 mounted on a landing gear strut 38, and a tire 40 may be mounted on the wheel 32. The drive wheel tire 40 contacts a runway or other ground surface 42 on which an aircraft is likely to travel at a contact patch 44, which is where traction may be controlled. The effective side-to-side dimension C of the contact patch 44 where the tire is in direct contact with the ground surface 42 can vary, depending on, for example, environmental temperature and tire pressure. Only one powered drive wheel 32 is shown in FIG. 2. An identical drive wheel (not shown) powered by a non-engine drive means, such as drive means 34, may be mounted on axle section 46 of the nose landing gear 30, and traction control of that wheel may also be maximized as described herein.

Information relating to the speed of the aircraft as it is driven on a ground surface by a non-engine drive means-powered drive wheel or wheels and the speed or torque of the aircraft's drive wheel or wheels must be obtained to maximize powered aircraft drive wheel traction. Wheel speed and/or torque may be measured directly by wheel sensors (not shown) or other sensors that provide wheel speed and/or torque information and may be located in each aircraft nose drive wheel or other drive wheel or in any other location suitable for obtaining the desired information. Such sensors are known in the art and are available for this purpose. If the onboard non-engine drive means is an electric motor, wheel speed may also be inferred from motor torque, current, or frequency. The effect produced by steering on the speed of powered drive wheels is also a factor that may require additional consideration. Any method or device by which aircraft wheel speed and/or torque can be determined, directly or indirectly, during aircraft ground travel may be used and is contemplated to be within the scope of the present invention.

Aircraft speed is difficult to measure directly, but may be inferred from the measurement of other parameters, for example, from a rolling sum of the speeds of the two aircraft powered drive wheels, preferably nose landing gear drive wheels, in an aircraft equipped with a pair of powered drive wheels. This may require adjustment based on steering inputs from an aircraft pilot. Aircraft speed can also be inferred from the measurement of the speed of other aircraft components associated with the wheels, including gears, tires, and/or any other component that rotates with a speed proportional to the speed of the aircraft or from an aircraft system that has aircraft speed sensing capability.

The determined or measured aircraft speed value and the measured speed and/or torque value for each individual wheel in the pair of aircraft drive wheels are communicated to a processor (not shown), preferably a processor with intelligent software, and compared. When the speed of one drive wheel is significantly higher than the speed of the other drive wheel, the processor is programmed to automatically and quickly cause the wheel torque to drop to zero, wait for the wheel speed to match the aircraft ground speed, and then increase the wheel torque. The recognition of a sudden increase in speed or acceleration of one drive wheel and the immediate reduction of applied torque controls traction as the aircraft continues its ground travel. When the speed of the previously accelerating wheel decreases to a selected reference velocity, torque can be increased to a value just below the torque value that caused the wheel to slip or skid. Sudden acceleration, indicating wheel slippage, can be determined by comparing the speeds or velocities of both drive wheels.

In accordance with the present method for maximizing traction control in aircraft drive wheels, wheel speed is controlled to keep the wheel in optimal traction (region 20 in FIG. 1) when driving torques are applied to the wheel. Optimal traction in an aircraft drive wheel 32 (FIG. 2) can be described as the traction represented on curve 16 (FIG. 1) from section 22 up to and including region 20. Because the aircraft drive wheel non-engine drive means 34 may operate on a feedback loop to drive the wheel 32 and thus the aircraft as described above, it is not necessary to know the mu-slip curve for this situation to keep drive wheel traction within the optimal traction region. Sufficient knowledge of the mu-slip curve, particularly the drive wheel speed corresponding to percent slip when optimal traction occurs, will be needed, however, to prevent the wheel from going too far into overspeed. As indicated, these steps are preferably performed automatically to maximize traction control for one or more aircraft nose or main landing gear drive wheels.

The speed of a drive wheel can be measured to determine slip, and drive torque can be adjusted automatically to maintain wheel speed in the optimal traction region on the mu-slip curve for prevailing runway or aircraft ground travel conditions. For example, driving torque transferred to a drive wheel will be automatically reduced when the drive wheel experiences slip in excess of a predetermined amount. Driving torque can also be automatically reduced when power draw on the drive means or electric drive motor is detected to be reduced. In the event that increased traction is detected, driving torque to a drive wheel will be automatically increased.

One suitable automatic aircraft traction control method is described in U.S. patent application Ser. No. 13/691,828, referred to above, although other automatic control algorithms may also be used and are contemplated to be within the scope of the present invention.

While the present invention has been described with respect to preferred embodiments, this is not intended to be limiting, and other arrangements and structures that perform the required functions are contemplated to be within the scope of the present invention.

INDUSTRIAL APPLICABILITY

The present invention will find its primary applicability in maximizing traction control during ground travel of aircraft equipped with non-engine drive means that drive aircraft drive wheels to move the aircraft independently on the ground without reliance on the aircraft's brakes and friction values defined by a mu-slip curve for traction control in a wide range of runway or ground travel conditions.

The invention claimed is:

1. A method for automatically controlling traction during ground travel of aircraft driven autonomously without reliance on aircraft engines and brakes and optimizing traction under prevailing ground travel conditions as the aircraft is driven autonomously, comprising:
   a. providing non-engine drive means automatically controllable to power and direct torque through an aircraft drive wheel and move the aircraft during ground travel, mounting the non-engine drive means within each one of a pair of nose landing gear drive wheels, and mounting a tire on each of the nose landing gear drive wheels in contact with an aircraft ground travel surface;

b. controlling the non-engine drive means to power and direct torque through each of the nose landing gear drive wheels to drive the aircraft on the ground travel surface, measuring a speed of each of the nose landing gear drive wheels as the aircraft is driven during the prevailing ground travel conditions to determine slip, automatically adjusting driving torque to each of the nose landing gear drive wheels, and maintaining traction between the tires and the ground travel surface in a maximized optimal traction range for the prevailing ground travel conditions corresponding to a region around a peak on a mu-slip curve representing maximum traction efficiency for movement of a non-engine drive means-powered nose landing gear drive wheel on the ground travel surface;

c. determining or measuring speed and torque information comprising a ground travel speed of the aircraft and a speed or torque of each of the non-engine drive means-powered nose landing gear drive wheels and communicating the ground travel speed of the aircraft and the speed or torque of each of the nose landing gear drive wheels to a processor;

d. processing the communicated aircraft ground travel speed and the speed or torque of each of the nose landing gear drive wheels, comparing the speed or torque of one nose landing gear drive wheel to the speed or torque of the other nose landing gear drive wheel, and automatically adjusting the speed or torque of the one or the other nose landing gear drive wheel to maintain the traction of each one of the nose landing gear drive wheels in the maximized optimal traction range; and e. during aircraft ground travel, automatically maintaining the traction of each one of the nose landing gear drive wheels within the maximized optimal traction range for the prevailing ground travel conditions corresponding to the region around the peak on the mu-slip curve.

2. The method of claim 1, further comprising automatically controlling drive torque directed to each one of the nose landing gear drive wheels to control the speed of each of the nose landing gear drive wheels to prevent an overspeed condition.

3. The method of claim 1, further comprising, when the determined or measured speed of the one nose landing gear drive wheel is higher than the determined or measured speed of the other nose landing gear drive wheel, automatically decreasing the torque of the one nose landing gear drive wheel to zero; and when the determined or measured speed of the one nose landing gear drive wheel speed is equal to the aircraft ground travel speed, automatically increasing the torque of the one nose landing gear drive wheel so that the speed of the one nose landing gear drive wheel is equal to the speed of the other nose landing gear drive wheel, and maintaining the traction of each one of the nose landing gear drive wheels in within the maximized optimal traction range for the prevailing ground travel conditions.

4. The method of claim 1, further comprising automatically maintaining traction of each one of the nose landing gear drive wheels within the maximized optimal traction range during a plurality of the prevailing ground surface conditions, weather conditions, temperature conditions, and tire conditions as traction is automatically maintained and the aircraft is driven by controlling the non-engine drive means to power and direct torque through each one of the nose landing gear drive wheels.

* * * * *